(12) United States Patent
Hirth et al.

(10) Patent No.: US 6,387,272 B2
(45) Date of Patent: May 14, 2002

(54) PROCESS FOR UTILIZING LIQUID MANURE MATERIAL

(75) Inventors: Thomas Hirth, Brühl; Rainer Schweppe, Karlsruhe; Kai Höhn, Wörth, all of (DE)

(73) Assignee: Fraunhofer-Gesellschaft zur Forderung der Angewandten Forschung e.V., Munich (DE)

( * ) Notice: Subject to any disclaimer, the term of this patent is extended or adjusted under 35 U.S.C. 154(b) by 0 days.

(21) Appl. No.: 09/347,928

(22) Filed: Jul. 6, 1999

(30) Foreign Application Priority Data

Jul. 3, 1998 (DE) .......................................... 198 29 799

(51) Int. Cl.⁷ .............................. C02F 1/42; C02F 1/44; B01D 61/02; C05F 3/00
(52) U.S. Cl. ................................ 210/652; 71/15; 71/33; 210/638; 210/651; 210/655; 210/697; 210/724; 210/767; 210/903
(58) Field of Search .................. 71/15, 33; 210/697, 210/723, 724, 903, 650–655, 634, 638, 693, 767; 423/306

(56) References Cited

U.S. PATENT DOCUMENTS 5,294,348 A * 3/1994 Horny et al. ............... 210/724

FOREIGN PATENT DOCUMENTS

| DE | 37 32 896 | 8/1988 |
| DE | 40 40 067 | 6/1992 |
| DE | 296 08 503 | 9/1996 |
| EP | 0 789 000 | 8/1997 |

OTHER PUBLICATIONS

Gebel; "Möglichkeiten Einer Umweltgerechten Und Wirtschaftlichen Aufbereitung Von Güllu"; Aug. 1991; pp. 518–528.

* cited by examiner

*Primary Examiner*—Steven P. Griffin
*Assistant Examiner*—Maribel Medina
(74) *Attorney, Agent, or Firm*—Foley & Lardner

(57) ABSTRACT

A process for utilizing the material of ammonium-containing effluent which contains further soluble constituents and, possible additional solids, comprising:
- a) optionally separating off the solids,
- b) concentrating the substantially solids-free ammonium-containing effluent to give an aqueous concentrate having an increased content of ammonium and additional soluble constituents, with simultaneous recovery of substantially ammonium-free pure water,
- c) precipitating ammonium as magnesium ammonium phosphate from the ammonium-containing aqueous concentrate, and
- d) separating off precipitated magnesium ammonium phosphate with recovery of substantially ammonium-free residual concentrate which at least partially contains the additional soluble constituents.

14 Claims, No Drawings

PROCESS FOR UTILIZING LIQUID MANURE MATERIAL

BACKGROUND OF THE INVENTION

1. Field of the Invention

The invention relates to a process for utilizing the material of ammonium-containing effluents in, for example, liquid manure.

Liquid manure arising in agricultural livestock production exhibits a high content of nitrogen, phosphorus and potassium. It has a considerable nutrient potential and is therefore useful as a fertilizer. However, directly applying liquid manure to agriculturally productive land, such as is presently practiced, creates risks to the environment. Thus, climate-damaging methane gas is released by the liquid manure. By nitrification of ammonia, the liquid manure constituent, nitrate is formed which pollutes water courses. The use of liquid manure, on a large scale, can easily cause overfertilization, and the nitrate content of the groundwater can exceed the recommended limits. Ammonia passes into the atmosphere and is transported back to the ground, for example, with rain over forested areas. The associated introduction of nitrogen represents an undesired additional fertilization which can contribute to an overfertilization of the forests.

As an alternative to the disposal of liquid manure by its use in fertilization of agriculturally productive land, environmentally friendly processing of the liquid manure with recovery of the valuable materials contained therein is currently desired. One valuable material contained in the liquid manure is ammonia. Depending on the pH, ammonia is present as physically dissolved ammonia or in the form of ammonium ions. The processes for the removal of ammonium from ammonium-containing effluents that are presently practiced operate by precipitation of ammonium in the form of magnesium ammonium phosphate. The precipitated salt obtained, magnesium ammonium phosphate, represents a valuable material. This can, for example, be used as a fertilizer or decomposed, for the recovery of ammonia, to give ammonia and magnesium hydrogen phosphate.

2. Description of the Related Art

DE-A 3,732,896 discloses a process for eliminating ammonium and phosphate from an effluent. By addition of magnesium salt and/or magnesium oxide, ammonium and phosphate are crystallized out and separated off as $MgNH_4PO_4PO_4.6H_2O$ (magnesium ammonium phosphate). If appropriate, after previously separating off solids, the process can be used for domestic and industrial effluents and also special effluents having a high ammonium content, for example, liquid manure.

DE-A 4,040,067 describes a process for the recovery of the ammonium content from process waters and effluents employing precipitation of magnesium ammonium phosphate, wherein, for accelerated precipitation and separation of magnesium ammonium phosphate, magnesium hydrogen phosphate and caustic soda solution are simultaneously added in a precipitation stage to the effluent to be treated. The separated magnesium ammonium phosphate is thermally split into ammonia and magnesium hydrogen phosphate in a regeneration stage, the precipitant being recovered and recycled into the precipitation stage.

A disadvantage of the known processes is that, because of the comparatively small ammonium concentrations in the treated effluents, relatively large liquid streams must be moved during precipitation and the subsequent separation of the precipitated salt. The ammonium-free effluents recovered also contain further undesired soluble constituents which partly originate from the precipitant used. For removing these, large quantities of liquid must again be processed. This results in processes which are economically prohibitive, for example, for processing liquid manure in a continuously operating installation.

SUMMARY OF THE INVENTION

It is one object of the invention to provide a process for environmentally friendly processing and utilization of liquid manure material. The ammonium contained in the liquid manure is recovered by separating the ammonium off as a valuable material in the form of a precipitated salt. The process permits the quantity of liquid to be processed to be greatly reduced and therefore operates more economically.

These objects are achieved by a process for recovering ammonium from ammonium-containing effluent which contains additional soluble constituents and, optionally solids if present, comprising:

a) optionally, separating off the solids, b) concentrating substantially solids-free ammonium-containing effluent to give an aqueous concentrate having an increased content of ammonium and additional soluble constituents, with simultaneous recovery of substantially ammonium-free pure water, c) precipitating ammonium as magnesium ammonium phosphate in the ammonium-containing aqueous concentrate, and d) separating off precipitated magnesium ammonium phosphate with recovery of substantially ammonium-free residual concentrate which at least partially contains the further soluble constituents.

Further objects, features and advantages of the present invention will become apparent from the detailed description of preferred embodiments that follows.

DETAILED DESCRIPTION OF PREFERRED EMBODIMENTS

The term "ammonium" as used below is a general term for physically dissolved ammonia and ammonia in the form of ammonium ion, unless differentiation between the two species is explicitly made. Ammonium-containing effluents include but are not limited to domestic and industrial effluents and also special effluents, such as water seeping from landfills, coke oven water, manure or liquid manure having an increased ammonium content. In addition to ammonium, the effluents mentioned contain additional soluble constituents, for example, those which pollute water courses. Examples include soluble constituent cations, such as, $Na^+$, $K^+$, $Mg^+$, $Ca^+$, $Fe^{2+}$, $Cu^{2+}$, $Zn^{2+}$ and anions such as chloride, nitrite, nitrate, sulphate, carbonate and phosphate.

According to the invention, the effluents mentioned can be concentrated before precipitation of ammonium is carried out. An aqueous concentrate having an increased content of ammonium, and possibly additional soluble constituents, and a purified substantially ammonium-free effluent (pure water) are obtained. The substantially ammonium-free pure water can still have a residual ammonium content of <250 mg/l, preferably <100 mg/l, particularly preferably <50 mg/l. The substantially ammonium-free pure water may contain at least a part of the possible additional soluble constituents, preferably at a markedly reduced extent. Preferably, the content of additional soluble constituents is so small that the pure water can be released into the outflow of an effluent treatment plant. The content of additional soluble constituents can include chloride ions generally present in an amount <50 mg/l, preferably <100 mg/l, and particularly preferably <50 mg/l; potassium ions generally present in an amount <200 mg/l, preferably <150 mg/l and particularly preferably <100 mg/l; sodium ions generally present in an amount <100 mg/l, preferably <50 mg/l, and particularly preferably <20 mg/l; copper ions generally present in an amount <1 mg/l, preferably <0.3 mg/l and particularly preferably <0.1 mg/l; magnesium ions generally present in an amount <1 mg/l, preferably <0.5 mg/l, and particularly preferably <0.2 mg/l; COD (chemical oxygen demand) generally present in an amount <1000 mg/l, preferably <500 mg/l and particularly preferably <200 mg/l;

During the concentrating step of the ammonium-containing effluent, precipitation can be carried out with a substantially reduced quantity of liquid. Moreover, the pure water is obtained already before precipitation is carried out. In this way, it is possible to avoid additional increases in the salt content, which may be caused by the over-stoichiometric addition of precipitant to the ammonium-containing effluent during the precipitation step.

Preferably, the concentrating of the ammonium-containing effluent can be carried out by reverse osmosis. The concentrating factor then amounts in general to between about 2 and about 10, preferably between about 3 and about 8, and more preferably between about 5 and about 7. All the conventional membrane materials used in reverse osmosis can be employed, and preferably have a pore size which makes the passage of ammonium ions through the membrane more difficult as compared to water molecules. In general, the mean pore size of the membrane is <5 nm, preferably <2 nm. Examples of suitable membranes are plastic membranes consisting of polyamide, polysulphone and polypropylene. These can be employed, for example, as wound modules or plate modules. The pressure difference is in general about 10 to about 200 bar, preferably about 20 to about 150 bar, particularly preferably about 30 to about 70 bar. A plurality of reverse osmosis steps can be carried out successively as, preferably, two reverse osmosis steps.

Before reverse osmosis, the separation of solids can be carried out if needed. This may be necessary when effluents have a high content of solids, for example, liquid manure. The separation of solids can be carried out as conventional filtration, microfiltration, ultrafiltration or nanofiltration. Preferably, ultrafiltration is carried out for separating off the solids, this being preferably operated by the transverse-flow principle. All conventional types of membranes, such as ceramic membranes, polymer membranes, stainless steel membranes or glass membranes may be used. Preferably, ceramic membranes having low abrasive properties may be used. The pore size of the membranes used is in general about 5 to about 500 nm, preferably about 10 to about 100 nm. In a particularly preferred illustrative embodiment, a silicon carbide membrane having a mean pore size of about 50 nm is used. Preferably, coarse particles of solids (for example >2 mm) are separated off before ultrafiltration is carried out, for example, by conventional sieving, in chamber filter presses or belt-screen presses.

In addition to solid particles, it is also possible to separate off, for example, oil droplets, bacteria, viruses or larger organic molecules by ultrafiltration. In this way, the total proportion of additional dissolved materials in the ammonium-containing effluent is reduced, so that higher concentrating factors for ammonium result in the subsequent reverse osmosis.

Ammonium is precipitated as magnesium ammonium phosphate from the aqueous ammonium-containing concentrate obtained in the reverse osmosis process. The ammonium content of the concentrate is in general 2 to 70, preferably 5 to 50, and particularly preferably 10 to 40 g/l, for example 10 g/l, in the case of unfermented liquid manure, and 40 g/l, in the case of fermented liquid manure. The ammonium-containing aqueous concentrate can contain additional soluble constituents, such as those mentioned above. Preferred additional constituents may include $Na^+$ and, inter alia, $K^+$, $Mg^+$, $Ca^{2+}$ which may be present in the following concentrations:

$Na^+$: 100 to 500 mg/l, preferably 250 to 300 mg/l $K^+$: 500 to 1500 mg/l, preferably 500 to 1000 mg/l $Mg^{2+}$: 0 to 100 mg/l, preferably 5 to 10 mg/l $Ca^{2+}$: 10 to 200 mg/l, preferably 20 to 100 mg/l $Cu^{2+}$: 100 to 600 mg/l, preferably 200 to 300 mg/l.

Precipitation occurs preferably by the addition of a precipitant. Suitable precipitants may include, for example, those described in DE-A 4,040,067, magnesium phosphate compounds, such as, for example, magnesium hydrogen phosphate, which is added together with a caustic soda solution, or, as described in DE-A 3,732,896, a magnesium salt or magnesium oxide/magnesium hydroxide, if appropriate with phosphate or phosphoric acid. Preferably, precipitation in the process according to the invention may be affected by addition of magnesium oxide as the precipitant in the presence of phosphate. Magnesium oxide may be added as a solid or as an aqueous suspension, preferably as an aqueous suspension. Magnesium oxide may be added together with magnesium salts, for example, magnesium chloride. It may also be possible to add magnesium chloride alone. In this case, one advantage of the process according to the invention is that, because precipitation occurs after reverse osmosis has been carried out, it is no longer the ammonium-containing effluent but rather the concentrate obtained therefrom that is additionally loaded with chloride. Preferably, however, magnesium oxide alone may be used, since the use of salts which pollute water courses is in principle undesired from an ecological point of view. The salting-up by overstoichiometric magnesium oxide here affects only the concentrate and does not impair the reverse osmosis step (by increasing the osmotic pressure).

The precipitation is carried out in the presence of phosphate. Phosphate may already be contained in the ammonium-containing effluent or may be added, for example, in the form of phosphoric acid, a primary magnesium phosphate $(Mg(H_2PO_4)_2.3H_2O$ or phosphorus pentoxide. Preferably, at least a part of the phosphate may already be present in the ammonium-containing effluent, and another part is added in the form of phosphoric acid or phosphorus pentoxide. An Mg:N:P molar ratio of in general (0.7 to 2):1:(0.8 to 1.2), preferably (0.8 to 1.2):1:(0.8 to 1.2), more preferably (0.9 to 1.1):1:(0.9 to 1.1), may be obtained by the addition of phosphate and magnesium oxide.

The pH during precipitation is in general about 8 to about 10, preferably about 8.2 to about 9.2, particularly preferably about 9. In the case of alkaline effluents, for example, liquid manure, the pH may be adjusted by the addition of acid. Preferably, phosphoric acid may be used for this purpose. In a particularly preferred embodiment of the process according to the invention, a neutral to weakly alkaline pH is set already before concentrating by reverse osmosis. In the case of alkaline effluents such as liquid manure, this is preferably effected by adding a part of the phosphoric acid required for the precipitation already before the reverse osmosis step. While not being bound to any one theory, ammonia appears to be predominantly present in the form of ammonium ions when reverse osmosis is carried out. Ammonium ions have a larger effective radius than physically dissolved ammonia molecules and are more effectively retained by the membrane. As a result, a permeate (pure water) which has a particularly low content of ammonia/ammonium may be obtained.

The precipitated magnesium ammonium phosphate salt may be separated off by conventional processes for solid/liquid separation, for example, by filtration. Preferably, separation by sedimentation, for example, in a settling vessel may be induced. The precipitated salt separated off may be used as a retard fertilizer. Ammonia may be recovered from the precipitated salt by thermal decomposition, for example, by steam stripping.

In a further preferred embodiment of the process according to the invention, precipitation is carried out in two stages, wherein, after a first precipitation and after the precipitated salt has been separated off, additional ammonium remaining can be precipitated by a repeated addition of magnesium oxide and, if necessary, phosphoric acid.

The residual concentrate obtained after the precipitated salt has been separated off has an ammonium content of up to about 200, preferably from about 25 to about 125, mg/l.

The precipitated salt consists in general of at least 80% by weight, preferably of at least 90% by weight, and more preferably of at least 95% by weight, of magnesium ammonium phosphate, and it can contain the following subsidiary constituents:

$KMgPO_4$: up to 10,000 ppm, preferably up to 100 ppm
$Mg_3(PO_4)_2$: up to 10,000 ppm, preferably up to 100 ppm
$Ca_3(PO_4)_2$: up to 10,000 ppm, preferably up to 100 ppm It is advantageous that the precipitated product, precipitated out of the concentrated solution, is closer to the theoretical composition than the precipitated products precipitated according to the prior art from solutions which have not been concentrated. Thus, the deviation in the N content according to the invention, for example, is only up to about 7%. This is in contrast to the prior art process where the deviation is frequently 15% or more.

The process according to the invention may be operated continuously. This may be particularly suitable for the continuous processing of liquid manure. In a preferred embodiment, the liquid manure used has an increased ammonia content as a result of an upstream biogas process. In this case, methane is first recovered in a biogas reactor from the liquid manure being processed. During the biogas process, microbial degradation of the organic nitrogen compounds contained in the liquid manure leads to the formation of ammonia, whereby the ammonium content can be increased by up to three times. As a result, an effluent of particularly high ammonium content is obtained. In addition to the environmentally friendly recovery and the thermal energy from biomass generated by combustion of the methane recovered, the present process has the advantage that ammonium may be recovered in very high yield from liquid manure.

The invention is explained in more detail by the examples which follow.

EXAMPLE 1

Liquid manure having high ammonium content and a pH of 8.2, and containing the following dissolved ingredients in the concentrations indicated: $NH_4^+/NH_3$ 10 g/l, $Na^+$ 280 mg/l, $K^+$ 680 mg/l, $Mg^{2+}$ 70 mg/l, $Ca^{2+}$ 20 mg/l, phosphate 250 mg/l, chloride 1050 mg/l, and nitrite 33 mg/l, was processed as follows:

In a first step, solids having a particle size of >2 mm were separated off by screening, and ultrafiltration was then carried out at a pressure of 2 bar, using a ceramic membrane. About 85% phosphoric acid was added to the filtrate obtained, until a pH of 7.5 was established, and the filtrate was subjected to a single reverse osmosis at 60 bar, for which a polyamide membrane having a mean pore size of 0.5 nm was used. This gave a water-clear permeate which, inter alia, contained 520 mg/l of $NH_4^+$.

For the precipitation of $NH_4^+$, a suspension of MgO in water was added as a precipitant with vigorous stirring in a slightly overstoichiometric quantity (about 3% relative to phosphate) to 5 l of the concentrate in a 10 l vessel. The pH was 7.0. The mixture was left to stand for 15 minutes until an almost pure white precipitate of magnesium ammonium phosphate had settled. A substantially ammonium-free concentrate was obtained.

The precipitate consisted of >98% by weight of magnesium ammonium phosphate hexahydrate.

EXAMPLE 2

Liquid manure having high ammonium content and a pH of 8.2, and containing the following dissolved ingredients in the concentrations indicated: $NH_4^+/NH_2$ 10 g/l, $Na^+$ 280 mg/l, $K^+$ 680 mg/l, $Mg^{2+}$ 70 mg/l, $Ca^{2+}$ 20 mg/l, phosphate 250 mg/l, chloride 1050 mg/l, and nitrite 33 mg/l, was processed as follows:

In a first step, solids having a particle size of >2 mm were separated off by screening, and ultrafiltration was then carried out at a pressure of 2 bar, using a ceramic membrane. About 85% phosphoric acid was added to the filtrate obtained, until a pH of 7.5 was established, and the filtrate was subjected to a two-fold reverse osmosis at 60 bar, using a polyamide membrane having a mean pore size of 0.5 nm. This gave a water-clear permeate which contained ingredients corresponding to the indicated values: $NH_4^+$ 15 mg/l, $Cl^-$ 45 mg/l, $K^+$ 82 mg/l $Na^+$ 13 mg/l, Cu<0.1 mg/l, $Mg^{2+}$<0.2 mg/l, COD (chemical oxygen demand) 114 mg/l.

The concentrate is characterized by the following analytical values: $NH_4^+$ content 22,000 mg/l, $K^+$ 9000 mg/l, $Na^+$ 9000 mg/l, $Na^+$ 1500 mg/l, $Mg^{2+}$ 63 mg/l, $Cu^{2+}$ 6 mg/l, conductivity 58 mS/cm, dry matter content 64,400 mg/l.

For precipitation of $NH_4^+$, a solution of 163 g of $MgCl_2$ in 240 ml of phosphoric acid (28.3% by weight) was added as precipitant with vigorous stirring to 5 l of the concentrate in a 10 l vessel. The pH was 9.0. The mixture was left to stand for 15 minutes until an almost pure white precipitate of magnesium ammonium phosphate had settled. A substantially ammonium-free concentrate having an $NH_4^+$ content of about 100 mg/l was obtained.

The precipitate consisted of >98% by weight of magnesium ammonium phosphate hexahydrate.

The entire contents of German Patent Application No. 198 29 799.8 are hereby incorporated by reference.

We claim:
1. A process of recovering ammonia values from ammonium-containing effluent which contains soluble constituents and, possible additional solids, comprising:
   a) optionally, separating off the solids,
   b) concentrating a substantially solids-free ammonium-containing effluent to give an aqueous concentrate having an increased content of ammonium and additional soluble constituents, with simultaneous recovery of substantially ammonium-free pure water,
   c) precipitating ammonium as magnesium ammonium phosphate from the ammonium-containing aqueous concentrate, and d) separating off precipitated magnesium ammonium phosphate with recovery of substantially ammonium-free residual concentrate which at least partially contains the additional soluble constituents, wherein the solids are separated by ultrafiltration and wherein the ammonium-containing aqueous concentrate has an ammonium content of 5 to 50 g/l before precipitating and the precipitated ammonium consists of at least 90% by weight of magnesium ammonium phosphate.

2. A process according to claim 1, wherein the concentrating comprises reverse osmosis.

3. A process according to claim 2, the reverse osmosis is carried out employing a membrane having a mean pore size of less than 5 nm.

4. A process according to claim 3, wherein the membrane is selected from the group consisting of polyamide, polysulphone and polypropylene.

5. A process according to claim 1, wherein the ammonium-containing aqueous concentrate has, before precipitating, the following contents of one or more additional soluble constituents:

$Na^+$: 100 to 500 mg/l $K^+$: 500 to 1500 mg/l $Mg^{2+}$: 0 to 100 mg/l $Ca^{2+}$: 10 to 200 mg/l $Cu^{2+}$: 100 to 600 mg/l.

6. A process according to claim 1, wherein precipitating comprises addition of magnesium oxide in the presence of phosphate at a pH between about 8 and about 10.

7. A process according to claim 6, wherein the pH is adjusted by addition of phosphoric acid.

8. A process according to claim 7, wherein at least part of the phosphoric acid is added before said concentrating.

9. A process according to claim 6, wherein precipitating is carried out in at least two stages.

10. A process according to claim 1, wherein liquid manure is used as the ammonium-containing effluent.

11. A process according to claim 10, wherein the liquid manure employed has an increased ammonium content as a result of an upstream biogas process.

12. A process according to claim 1, wherein precipitating comprises adding a precipitant.

13. A process according to claim 12, wherein the precipitant is selected from the group consisting of magnesium hydrogen phosphate, magnesium oxide and magnesium chloride.

14. A process according to claim 1, comprising a continuous process.

* * * * *